J. & M. NAËDER.
HYDRAULIC TRANSMISSION.
APPLICATION FILED JAN. 19, 1914.
1,237,679.
Patented Aug. 21, 1917.
8 SHEETS—SHEET 1.
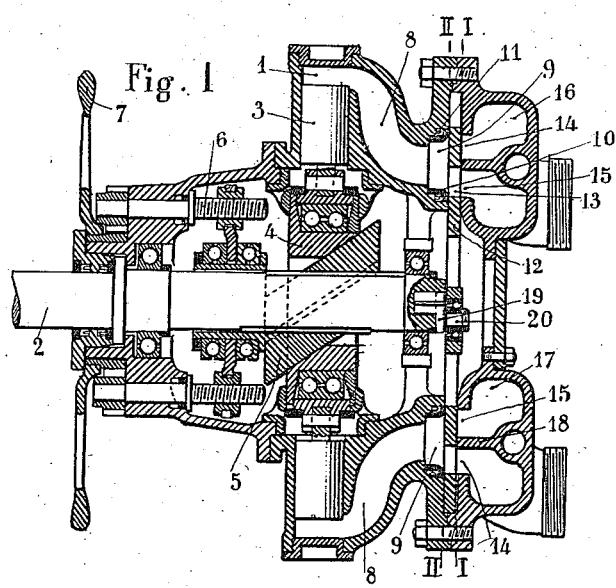
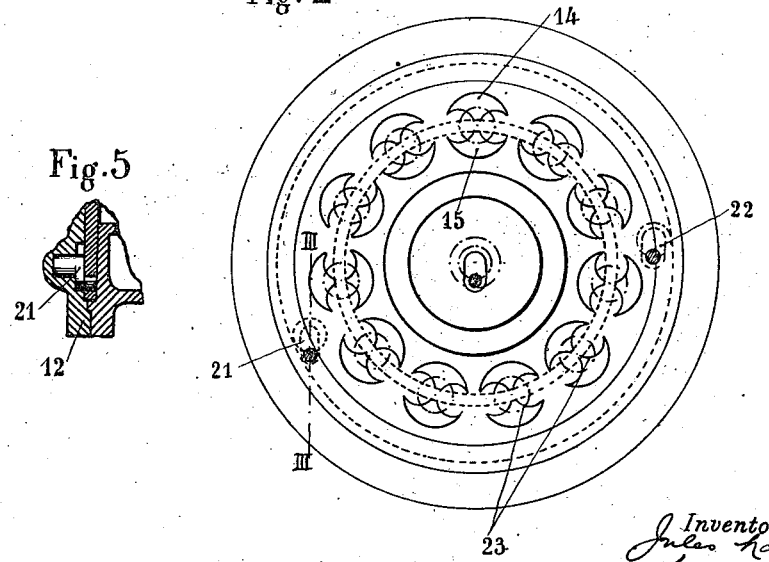

J. & M. NAEDER.
HYDRAULIC TRANSMISSION.
APPLICATION FILED JAN. 19, 1914.
1,237,679.
Patented Aug. 21, 1917.
8 SHEETS—SHEET 2.
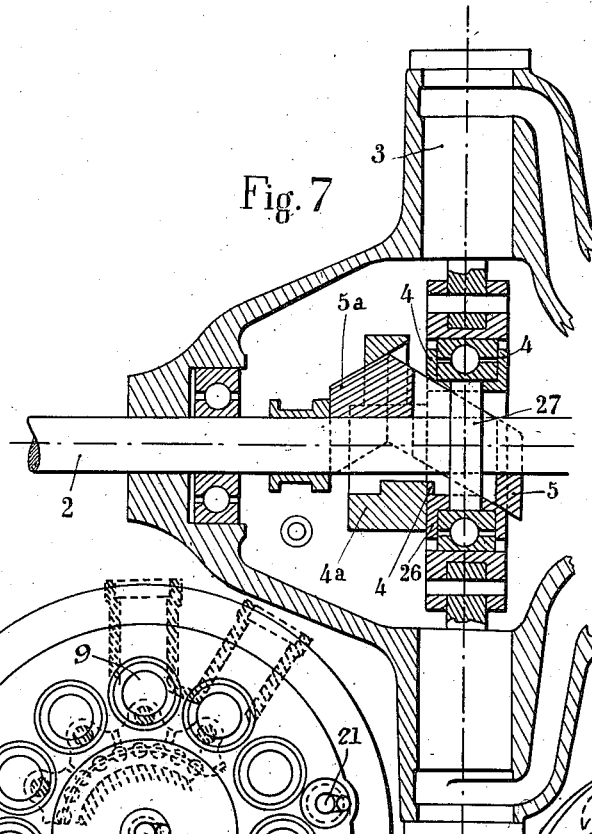
Fig. 7
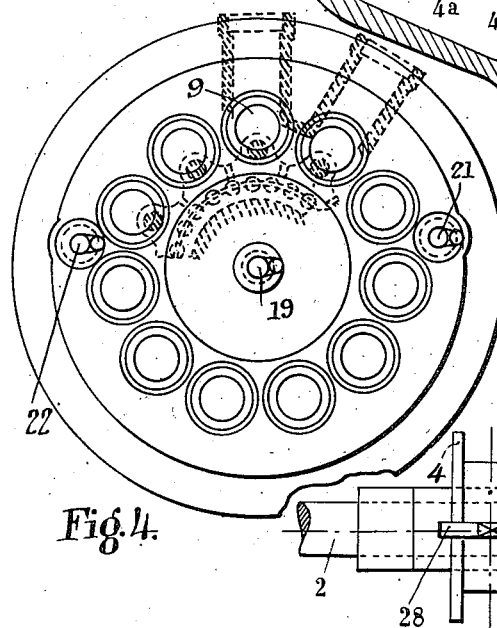
Fig. 4.
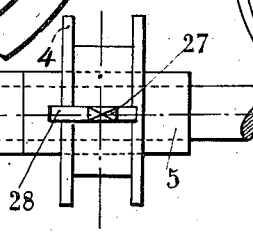
Fig. 8.
Fig. 3.
Witnesses—
Lionel Ernest Bussey.
John T. Bush.
Inventors
Jules Naeder and
Maurice Naeder
by
Attorney.

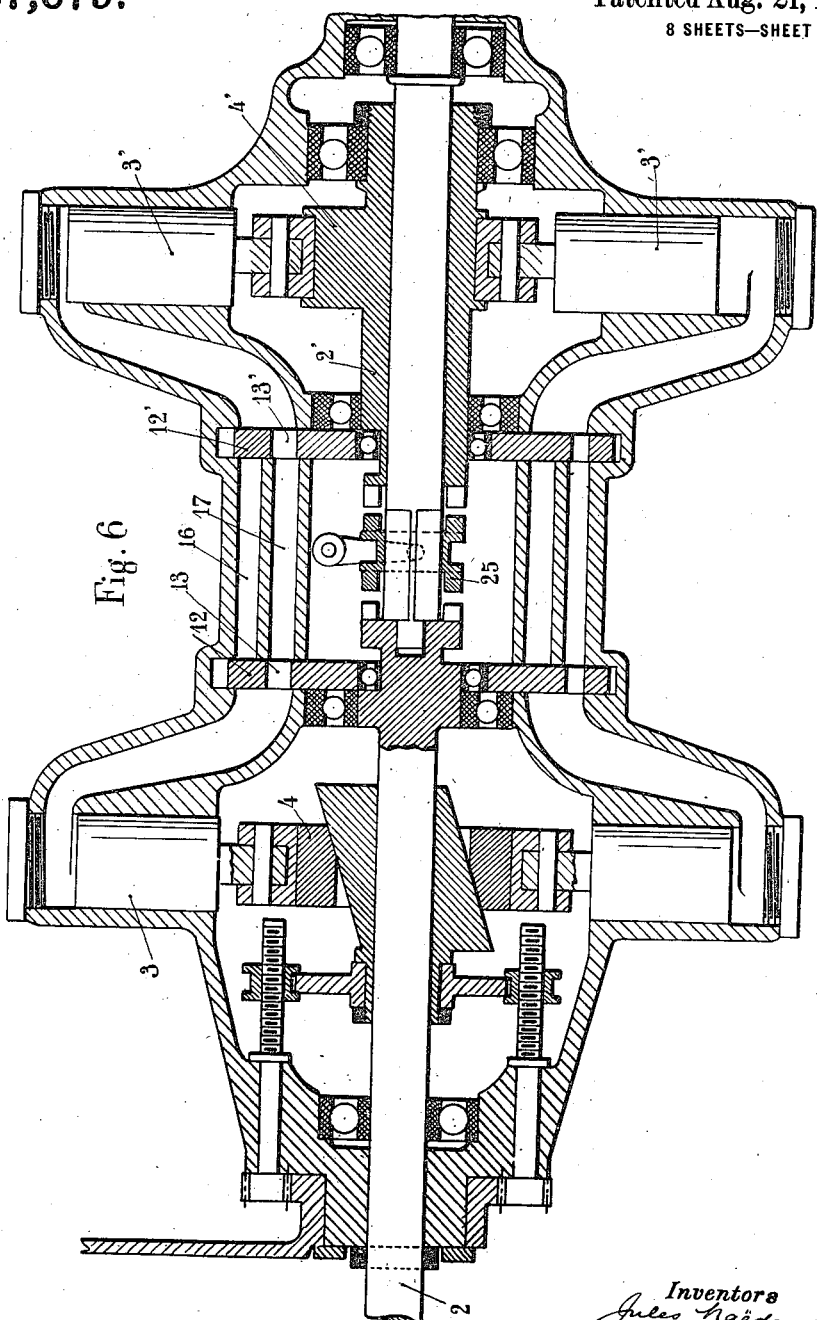

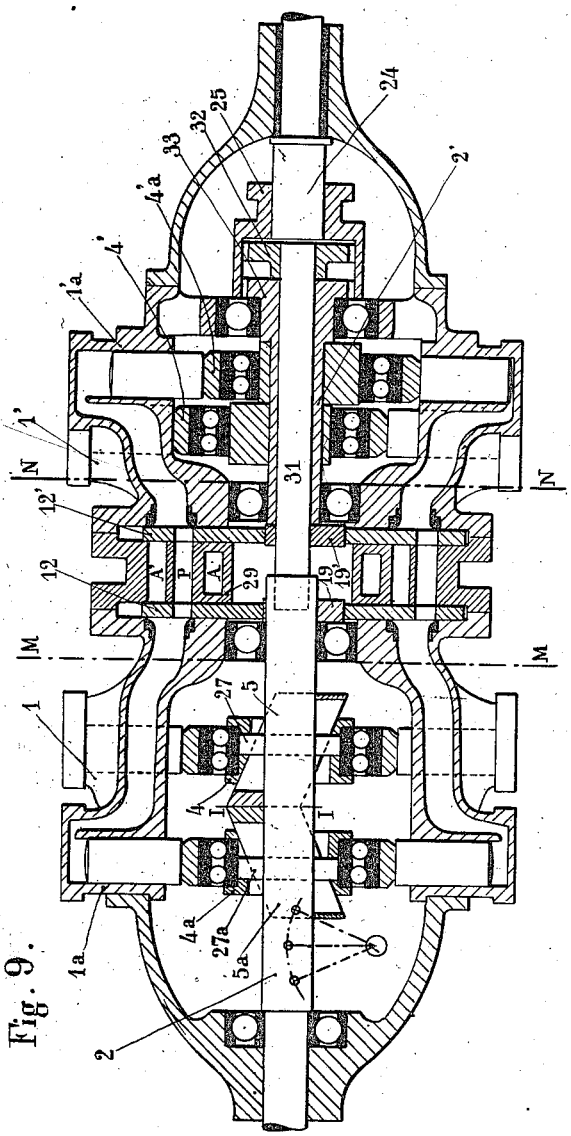

J. & M. NAËDER.
HYDRAULIC TRANSMISSION.
APPLICATION FILED JAN. 19, 1914.

1,237,679.

Patented Aug. 21, 1917.
8 SHEETS—SHEET 5.

Witnesses—

Inventors
Jules Naëder and
Maurice Naëder
by
Attorney.

J. & M. NAËDER.
HYDRAULIC TRANSMISSION.
APPLICATION FILED JAN. 19, 1914.

1,237,679.

Patented Aug. 21, 1917.
8 SHEETS—SHEET 7.

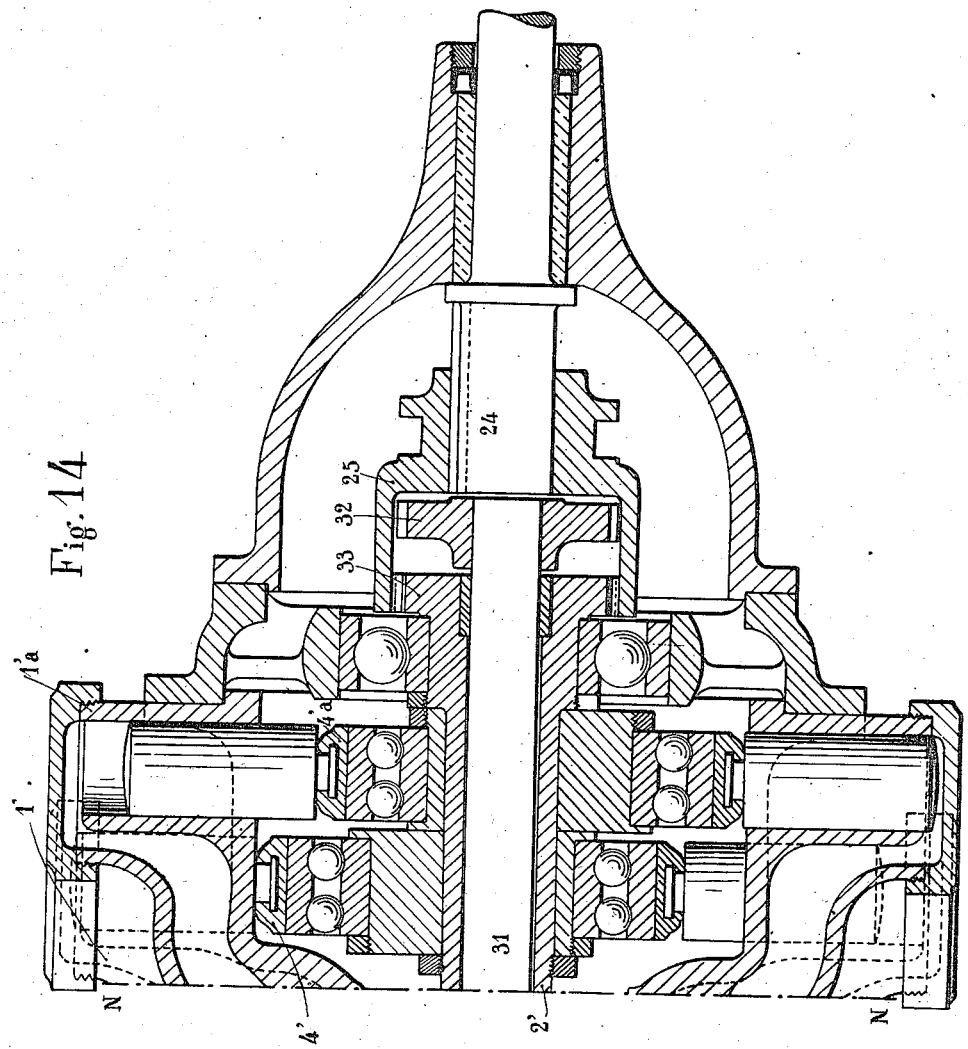

UNITED STATES PATENT OFFICE.

JULES NAËDER AND MAURICE NAËDER, OF LA MONTAGNE ST. GERMAIN, NEAR ST. GERMAIN LES CORBEIL, FRANCE.

HYDRAULIC TRANSMISSION.

1,237,679.           Specification of Letters Patent.     Patented Aug. 21, 1917.

Application filed January 19, 1914. Serial No. 813,128.

*To all whom it may concern:*

Be it known that we, JULES NAËDER and MAURICE NAËDER, citizens of the French Republic, residing at La Montagne St. Germain, near St. Germain les Corbeil, Seine et Oise, France, have invented a certain new and useful Hydraulic Transmission, of which the following is a specification.

The object of the present invention is to provide a distributing arrangement insuring the distribution of all liquids and fluids of whatever nature under the best conditions as regards absence of leakage and with the minimum of friction. The invention aims likewise at the application of this distributer to a hydraulic change speed gear apparatus, that is to say, to an apparatus in which the motor couple or torque is varied by a variation in the volume of liquid circulating between two sets of pumps. Finally, when the pumps are formed by sets of radiating cylinders, the invention relates also to the arrangement adopted for the element which controls the displacement of the pistons in the radiating cylinders.

The distributer is distinguished by the combination with two concentric reservoirs—one for inlet and another for delivery—placed between the two sets of pumps of a valve interposed between the front of the openings communicating with the cylinders of the set of motive pumps and the front of the openings of the reservoirs, this valve being actuated, by any suitable kinetic means, by a planetary or epicyclic movement determined by the condition that each point of the valve, and particularly the center of the holes of communication which are formed in it, describes, for each revolution of the driving shaft, the circumference of a circle the radius of which is such that the holes of the valve move successively opposite to the inlet openings and to the delivery openings of the reservoirs and between these openings.

The invention is illustrated in the accompanying drawings.

In Figures 1 to 5 of the drawings the distributing arrangement is shown, by way of example, combined with a generating pump intended for feeding a receiving pump, which is not shown in the drawings. The apparatus taken as a whole, and chosen in this way, by way of example, belongs to the category of apparatus designated "hydraulic change speed apparatus."

In Figs. 6 to 8 are indicated modifications in which a hydraulic transmission arrangement producing a change gear is combined with a system of distribution, while In Figs. 9 to 14 further modifications are illustrated.

Fig. 1 is a vertical section, through the axis of the driving shaft of the apparatus or pump intended for the transmission to another similar apparatus, or to an apparatus of any suitable system not shown, of the energy derived from the driving shaft. The distributing arrangement which regulates the circulation of the liquid between the two apparatus is seen in section in this figure.

Fig. 2 is a view on the line I—I of Fig. 1. This figure gives a view of the face of the inlet and outlet reservoirs. In this face are to be seen the openings in the same upon which the distributing valve is applied.

Fig. 3 is a view on the line II—II of Fig. 1. In this view the distributer is shown mounted against the supporting face of the reservoirs, the openings of which are shown by dotted lines.

Fig. 4 is the same view on the line II—II of the Fig. 1, but projected toward the left of this figure. It shows, in elevation, the openings of the conduits issuing from the cylinders, two of which have been indicated in dotted lines.

Figure 10:
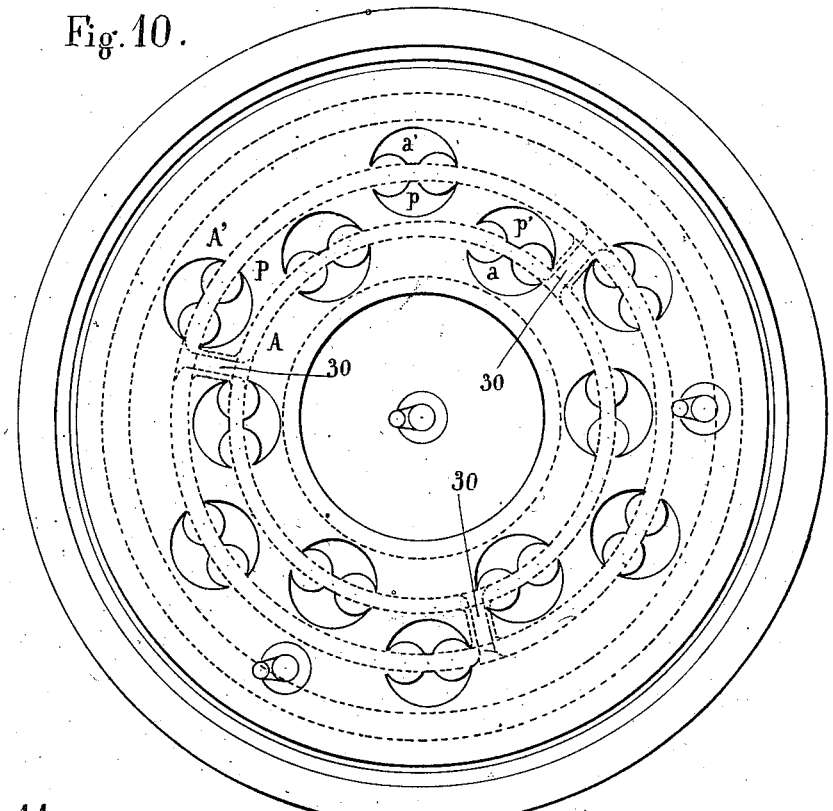

Finally, Fig. 5 is a section, along the line III—III of Fig. 2, of the support or bearing of one of the controlling cranks of the distributing valve.

As is to be seen in Figs. 1 to 5, the distributing arrangement has been combined with a pump having radiating cylinders 1 arranged around a driving shaft 2. In each of these cylinders a piston 3 works, and all the pistons 3 are connected up to an eccentric disk 4, the movements of which, in a plane perpendicular to the axis of the driving shaft, are controlled by a cam 5, formed by a cylinder threaded on the driving shaft, and of which the axis forms a suitable angle with this shaft. The movements of the cam 5, effected parallel to the axis of the driving shaft, are produced by a controlling system, such as that indicated at 6, by means of a hand lever or wheel 7.

The fluid, put in circulation by the pistons 3, and of a volume which varies according to the position of the cam 5, passes into the conduits 8 which connect the working chambers or cylinders of the pistons 3 with the openings 9. Each opening 9 is lined with a sleeve or bush 10 concentric with the opening, in which it is adjusted, and in which it is able to move longitudinally. The sleeve is combined on the other side with a lining formed, for example, by a U leather 11, lodged in an annular groove in the wall of the opening. The sleeves 10, lining the face of the openings 9, press against the distributing valve 12. This distributer, in the particular construction represented, is circular in shape. It is pierced by holes 13 which, in the construction represented in the figures, are arranged on the same circumference, having for its center the center of the valve. As has already been said, the edges of the sleeves lining the openings 9 are applied to one of the faces of the valve; the other face is applied to the faces of the openings 14 and 15, with which the inlet and outlet reservoirs 16 and 17 are provided. Each of these reservoirs, which are joined together and concentric, is formed, for example, by a body having a mid section of any suitable form, and they are separated by a cylindrical partition 18. The section of the holes 13 of the distributing valve and the shape of the openings 14 and 15 are such that, on one side, the holes 13 may always be opposite the openings 9, and that, on the other side, these holes 13 may be at one time opposite the openings 15 (inlet period), at another time opposite the openings 14 (outlet or delivery period), and at another time between these two openings (end of the inlet or delivery stroke). The movements of the valve 12, to which these different positions of the holes 13 correspond at the proper moment, are effected in the following manner:—A crank or an eccentric 19 is keyed in any suitable manner, upon the driving shaft perpendicularly to its axis, or in the same manner, to a shaft sharing in the movement of the driving shaft. The pin 20 of this crank fits into a hole made in the thickness of the valve. The reciprocating movement which the crank 19 will thus impart to the valve, when the driving shaft rotates, is controlled by two other cranks 21 and 22, having each two pins, one of which can rotate in a hole made in the wall of the reservoirs 16 and 17, and the other of which can rotate in a hole made in the valve 12. The positions of these two cranks are quite arbitrary, but the two cranks must have the same radius as that of the crank 19, to which they remain always parallel. The value of the radius is given by the distribution to be effected.

It will be seen, after what has been said in the foregoing, that the driving shaft 2, in rotating imparts to the valve 12, by means of the crank 19, a movement which will be controlled by the two other cranks 21 and 22. The valve or distribution diagram will permit this movement to be effected at such a speed that all the holes 13 pass, while revolving, before the openings 9 and expose or unmask at the desired time the openings 14 and 15, with all the precision necessary to allow of the suction and delivery movements of each of the pistons taking place.

In Fig. 2 is shown in mixed lines the circumferences forming the line of movement of the center of each hole 13.

It is possible, as may be conceived, by means of such an arrangement to insure distribution, whatever may be the speed of rotation of the shaft 2. The movements of the valve 12, whatever this speed may be are, in fact, of an amplitude sufficiently slight (they are the function of the radius of the small cranks 19, 21 and 22) to insure that the work absorbed shall be very slight, and that the friction on the machined or finished surfaces, between which the valve moves, may be reduced to the minimum.

It is to be observed also that the fluid entering through the openings 9 applies constantly and in a very forcible manner the sleeves 10 to the valve 12 and contributes thereby to apply or press this valve upon the supporting surface of the reservoirs 16 and 17. It will be sufficient carefully to finish all the surfaces in contact in order to insure an absolute fluid-tight joint.

It is obvious, of course, that in the distributing arrangement which has just been explained the holes 13 of the valve, instead of being circular, as they have been shown, might take any other form and that their position could be determined in quite another way from that represented. These details are fixed by a diagram in accordance with the form and the position of the openings 14 and 15.

In the construction shown in the drawings, all the holes 13 have been arranged upon a circumference having a diameter equal to that upon which the openings 9 have been traced, and the openings 14 and 15 have all an axis of symmetry converging upon or coinciding with the axis of the driving shaft. However, the arangement could be something quite different, and particularly if the openings 9 were arranged not upon a circumference but by quite another method, as, for example, sinuously.

The industrial results obtained with the arrangement which has just been described are numerous. The low speed imparted to the distributer and the advantageous results which the slow speed possesses have already been pointed out. It may be remarked also that, with this system, the use of clack valves and the inconveniences which the use of these valves entail are entirely obviated. Finally, it must be noted that all points of the distributer move with the same speed, with the result that the wear and tear of the same is strictly uniform throughout.

In Fig. 6, there is indicated a particular combination of the system of distribution hereinbefore described with a hydraulic transmission arrangement producing a change of speed.

This figure represents, in vertical section through the axis, a hydraulic change speed apparatus in which a receiving pump having radiating cylinders has been combined with the motive pump represented in Fig. 1. In this arangement the double chamber, formed by the concentric reservoirs 16 and 17, is situated between two valves 12, 12' mounted, as has been explained, by means of a small crank or of an eccentric, the first (the valve 12) upon the driving shaft 2, and the other (the valve 12') upon a hollow shaft 2' forming an intermediate shaft, and to which are coupled the pistons 3' of the receiving pump. The coupling of the pistons 3' is effected, as in the case of the pistons 3, by attaching the heads of the pistons to an eccentric 4' controlled by the intermediate shaft 2'. The eccentricity of the member 4', is, however, constant, and is in this respect different from what obtains in the case of that of the shaft 2.

The secondary shaft 24 traverses the intermediate shaft 2'. A clutch 25 enables the primary shaft 2 to be engaged either with the secondary shaft 24 (direct engagement) or with the intermediate shaft 2'.

As may easily be seen after examination of the figure, the combination of the two valves 12, 12' insures the distribution of the liquid between the chambers of the pumps 3 and 3' whatever may be the difference of speed existing between these two pumps.

In these methods of carrying out the invention, the cylinder-cam 5 works perfectly for low speeds of rotation of the driving shaft. With somewhat higher speeds, however, it has the inconvenient feature that when the eccentricity of the eccentric 4 is altered by the longitudinal displacement of the cam 5, the want of equilibrium of the eccentric when put into operation gives rise to vibrations which are detrimental to the good working and to the preservation of the apparatus. On the other hand, by reason of the inclination given to the cylinder forming the cam 5, the stress borne by the eccentric 4, which rests upon the inclined face of this cylinder, tends to drive it outside the plane of the pistons, which entails the necessity of maintaining the eccentric in position by means of rings or thrust bearings arranged laterally, the existence of which sets up a friction which is detrimental to good mechanical efficiency.

In order to obviate these two inconveniences there has been devised the arrangement represented in Fig. 7, in vertical section through the axis and in Fig. 8 in plan. In this arrangement the cylinder-cam 5 is connected to a cam $5_a$, which is itself formed by a cylinder inclined to the axis of the shaft 2 and threaded on this shaft. The cam $5_a$ is symmetrical with the cam 5 in respect to the plane of junction of these two cams, which is perpendicular to the shaft 2. On the cam $5_a$ there is mounted, in the same way as the eccentric 4, a counterweight $4_a$ arranged in such a way that it balances the eccentric 4. This counterweight is guided in such fashion that it can slide diametrically at 26 on the face of the eccentric 4.

It is readily seen that the effect of this arrangement is to balance continually the eccentric 4 in all its different positions of eccentricity. In fact, the counterweight $4_a$ recedes from the axis of the driving shaft as much as the axis of the eccentric 4 is removed from the axis of the driving shaft by the displacements or movements of the cam 5. The movements of the cams 5 and $5_a$ are simultaneous because these cams are in one piece and they set up radial movements in opposite directions of the counterweight $4_a$ and the eccentric 4, because the gradients acting upon this counterweight and upon this eccentric are of the same inclination, but arranged symmetrically the one with respect to the other.

On the other hand, in order to balance the oblique reactions developed on the eccentric, as has been pointed out, a pin or key 27 is mounted in the driving shaft 2 and traverses the shaft completely, passing through its axis. This pin or key traverses also the cylinder-cam 5, but it passes through a slot 28 in this cylinder sufficiently long to permit of the cylinder making all the longitudinal movements necessary for the purpose of varying the eccentricity of the eccentric 4. At each of its extremities the pin or key engages in corresponding mortises made in the eccentric 4, which thus rests, by means of this pin or key, on the driving shaft, without there being any necessity to have recourse to side thrust bearings for the purpose of supporting it. In fact, this pin or key 27 takes up entirely the oblique thrusts which constitute one of the inconveniences to which attention has just been drawn.

The distributer, which has just been described, is perfectly suitable for the purpose of insuring the distribution of the liquid between the parts of the hydraulic change speed gear shown in Fig. 6. However, in the arrangement of pumps in question the delivery of liquid is not absolutely regular in this respect that, with each turn of the driving shaft for a given position of the cylinder-cam, the variations in the quantity of liquid delivered by the whole of the cylinders can be shown graphically by a sine curve, the minimum or maximum points of which correspond to the passages of the summit or highest point of the cylinder-cam between two consecutive cylinders of the set of motive pumps. It follows from this, therefore, both in regard to the set of motive pumps and to the set of receiving pumps, that vibrations detrimental to the efficiency of the apparatus must be set up. It is thus desirable, in the case of apparatus whose driving shaft rotates at high speeds, to employ an arrangement hereinafter described and which likewise constitutes an integral part of the present invention.

The object of this arrangement is a particular disposition of the inlet or suction and delivery reservoirs, whereby it is possible to arrange on the driving shaft two or more sets of motive pumps with radiating cylinders, the cylinders being displaced from one set to the other at an angle which is such that the strokes of the piston cross, that is to say, that the maximums of the variations of delivery of the one set correspond with the minimums of the variations of delivery of the other set, which regulates the delivery of the system regarded as a whole and suppresses vibration.

This disposition is distinguished by the fact that the intermediate reservoir has three concentric chambers, the external chambers serving as an inlet or suction reservoir for one of the sets or for a combination of similar sets arranged on the driving shaft, and the internal chamber, which communicates with the external chamber by means of suitable channels, serving as an inlet or suction reservoir for the other set or for the combination of similar sets displaced in regard to the first, while the intermediate chamber serves as a common chamber for delivery to the two sets and to the two combinations of sets. On the other hand, the valve, or if it is a question of the arrangement hereinbefore described and shown in Fig. 6, the two valves, instead of being bored by a single row of distributing holes, have two such rows, each of which is applicable to one of the sets.

This disposition insures the regularity of the delivery resulting from this possibility, thanks to the two inlet or suction chambers existing in the intermediate reservoir, of the arrangement on the driving shaft of two sets of radiating cylinders, two to each set, the two sets being displaced suitably the one with regard to the other. The regularity of delivery results also from the fact that the two inlet or suction chambers communicate.

The invention relates also to a special arrangement of the element controlling the displacement of the pistons of the sets of motive pumps. This arrangement consists in connecting, by rendering them integral, the cylinder-cams which produce by their displacements the variations in the resisting couple developed in each set of motive pumps, and in arranging them symmetrically with respect to a plane perpendicular to the driving shaft, and passing through or over their junction surface. The result of this arrangement is an accurate balancing of the masses in movement and a balancing of the resistances which are always opposed during the rotation of the cylinder-cams.

Finally, the symmetrical arrangement of the cylinder-cam which acts upon the piston rods of the pistons of the second set, has the effect that if, at one of the extremities of a diameter of the valve, one of the openings of the first set is at delivery, the opening of the second set, which is to be found in the neighborhood of the other extremity of this diameter, is likewise at delivery. The valve is therefore subjected by this fact to a regularly distributed pressure which presses it against the port face on the reservoir.

The Figs. 9 to 14 refer to a form of construction of this arrangement.

Fig. 9 is a vertical section of the entire system made through the axis of the driving shaft.

Fig. 10 is a front elevation of the supporting port face of the distributing valve on the inlet or suction and delivery reservoirs. In this view the openings of these reservoirs are to be seen.

Figure 11:
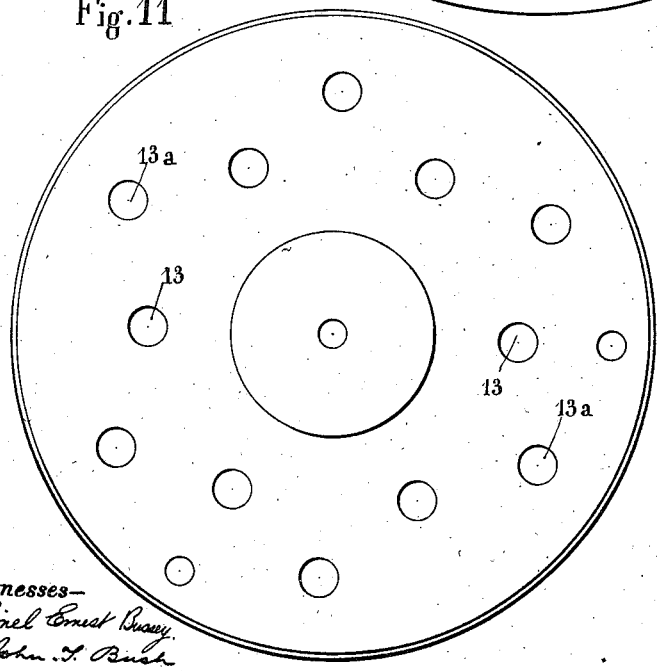

Fig. 11 is an elevation of the valve showing the holes with which it is pierced.

Figure 12:
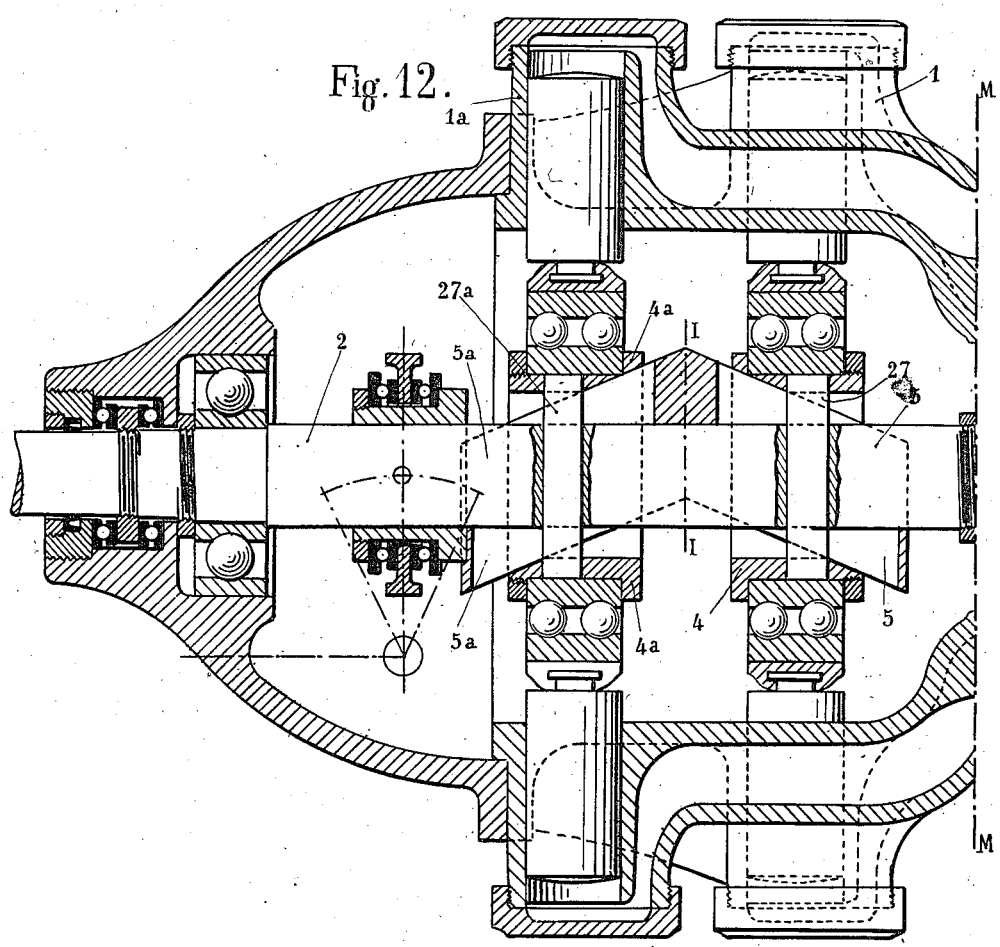

Fig. 12 is an enlarged section of the entire system of motive pumps, the section being taken along the direction of the axis of the motor from the line of connection M—M of Fig. 9.

Figure 13:
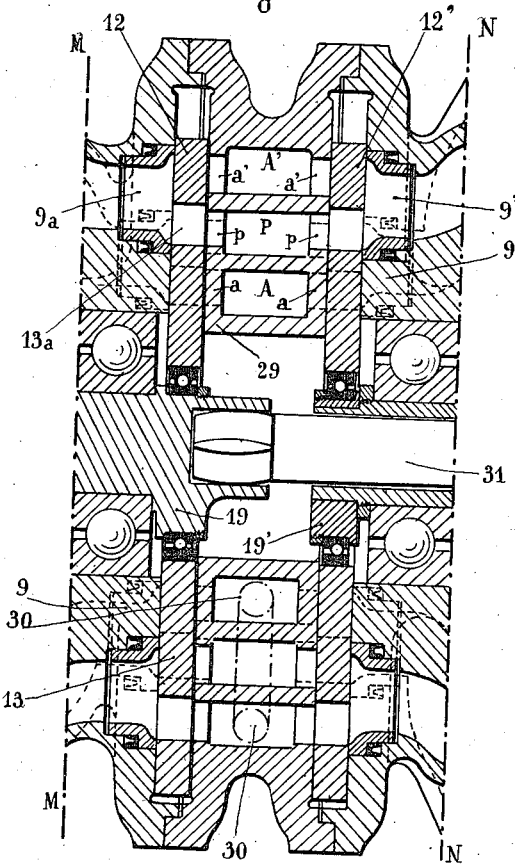

Fig. 13 is an enlarged view in vertical section of the distributer, this section being made through the axis of the driving shaft and being contained between the lines of connection M—M and N—N of Fig. 9.

Finally, Fig. 14 is likewise an enlarged view of the set of receiving pumps, in vertical section along the axis of the driven shaft from the line N—N of Fig. 9.

As may be seen in these figures, the system, in accordance with this form of construction, comprises essentially three parts: (1) the whole of the motive pumps with radiating cylinders 1, $1_a$; (2) the whole of the receiving pumps with radiating cylinders 1', $1'_a$; and (3) the distributing element carrying the valves 12 and 12' moving on each face of the annular reservoir 29 divided into three chambers, the external one of which A' forms the inlet or suction reservoir for the set of cylinders $1_a$, an interior one A which forms the inlet or suction reservoir for the set of cylinders 1 and which communicates with A' through the channels 30, and an intermediate chamber P, which is situated between the two others and which forms a delivery reservoir common to the two sets 1 and $1_a$.

I. *Sets of motive pumps.*

The element which controls the movement of the pistons of the set 1 is a cylinder-cam 5 keyed on the driving shaft with the help of the pin or key 27 which completely traverses the shaft, passing through its center, and insures as a result of this, the participation of the cam in the rotary movement of the driving shaft, but is arranged in a groove or slot of the cylinder-cam which is sufficiently large to allow for the displacement of this cam along the driving shaft. To this cam 5 is attached, in any suitable way, a cam $5_a$ mounted in the same manner on the shaft 2 with the help of a pin or key $27_a$. This cam is, however, always symmetrical with the cam 5 in respect to the plane perpendicular to the driving shaft and indicated in Fig. 12 by the straight line I—I. The keys 27, $27_a$, in addition to their rôle as means of connection or engagement, also serve the part of thrust bearings by taking the lateral thrusts acting upon the eccentric rings 4, $4_a$ to the shaft 2 itself. On each cam is mounted an eccentric ring 4, $4_a$, which is engaged by it in its rotary movement and of which it changes the eccentricity when it is displaced longitudinally on the shaft. Between this eccentric ring and the heads of the pistons a ball bearing may be introduced in the interior of which the eccentric rotates. On each ball-bearing are fixed the heads of the piston rods of the corresponding set. When, as the result of a longitudinal displacement imparted to the cams 5, $5_a$, by any means whatever, the center of each of the eccentric rings ceases to coincide with the axis of the shaft 2, the pistons of each set will receive an alternating movement the amplitude of which will be so much the greater and will produce a delivery so much the greater as the center of each disk is farther removed from the axis of the shaft 2. The pistons are equal in number in each set and this number is preferably a pair, which allows of the strokes of the piston crossing, as has already been pointed out, instead of coinciding or being added one to the other. On the other hand, the two sets of cylinders 1, $1_a$ are displaced one with respect to another at such an angle that the projections of the axis of the cylinders on a plane parallel to their plane may be regularly distributed. As, in the case of the form of construction represented in the figures, there are in each of the two sets 1, $1_a$ six cylinders, the two sets 1, $1_a$ are displaced by thirty degrees.

II. *Set of receiving pumps.*

The element receiving the impulses of the pistons of the set 1' is a cam fixed on the hollow shaft 2' forming an intermediate shaft between the driving shaft 2 and the driven shaft 24. On this cam rests an eccentric ring 4', the eccentricity of which with respect to the axis of the line of the shafts 2, 2', 24, is constant. Another cam, displaced with respect to the first by 180 degrees, receives the impulses of the pistons of the set $1'_a$. This cam is likewise fixed on the shaft 2' and carries an eccentric ring $4'_a$, the eccentricity of which, with respect to the axis of the shaft 2', is equal to that of the ring 4', and is likewise constant.

A sliding clutch 25, mounted on the driven shaft 24, puts this shaft in engagement either with the primary shaft 31 prolonging the driving shaft (direct drive), or with the intermediate shaft 2', according as the internally toothed rim with which it is provided, comes into contact with the pinion 32 wedged on the primary shaft or with the pinion 33 forming one piece with the intermediate shaft.

III. *Distributing element.*

The purpose of this element is to distribute the liquid delivered by the pistons of the set 1 or $1_a$ to the pistons of the sets 1', $1'_a$, by causing the corresponding cylinders to communicate during the period of delivery which takes place in the course of each of the revolutions of the driving shaft 2. It has likewise to distribute to the pistons of the set 1 or $1_a$ the liquid taken in by these pistons during each suction period, by causing the working spaces of the corresponding cylinders to communicate with the working spaces of the cylinders of the sets 1' or $1'_a$, which are, at the same moment, at the delivery period. In short, it must insure the circulation of the liquid with a delivery, which varies according to requirements, between the two systems of pumps.

For this purpose, it has an annular reservoir 29 formed by the re-union of the three concentric chambers A' P, A. These chambers are pierced by openings $a'$, $p$, $a$, in each of their lateral faces, which are thoroughly finished or machined. The openings $a'$, $p$ of one of the faces are opposite to openings $9_a$ in a face of the casing of the set of pumps $1'_a$, each of which openings $9_a$ communicates with the base of a cylinder of the set $1_a$. The openings $a'$, $p$ of the other face are opposite to openings $9'_a$ in a face of the casing of the set of pumps $1'_a$, each of which openings $9'_a$ communicates with the base of a cylinder of the set $1'_a$. The openings $p$, $a$ are in front of openings 9, 9' arranged similarly, and each of which communicates respectively with the base of a cylinder of the set 1 and of the set 1'. A valve is arranged between each face of the reservoir 29 and the corresponding face of the casing of the sets of pumps. One of them, the valve 12, is mounted on the driving shaft 2; the other, the valve 12', is mounted upon the intermediate shaft 2'.

Each valve is mounted in such a way that the rotary movement of the shaft upon which it is arranged imparts to it a planetary movement which is determined by the condition that each point of the valve describes the circumference of a circle at each revolution of the shaft. This planetary or epicylic movement may obviously be carried out with the help of any kind of kinetic connection. In the form of construction represented in the figures, the movement of the valve is obtained, as has been hereinbefore indicated, by the application of two small parallel cranks, each having two opposed shafts or spindles, one of which is disposed in a bearing formed in the face of the reservoir 29, and the other in a bearing made in the valve, these two cranks having the same radius, which is determined by the distribution to be effected. On the other hand the valve is engaged by an eccentric 19 (or 19') the radius of which is equal and parallel to that of the small cranks.

In each valve are pierced holes $13_a$, 13 arranged respectively, in the form of construction represented upon two concentric circumferences having for their center the center of the valve, each hole insuring the distribution for one cylinder. The section of these holes, the shape of the openings $a'$, $p$, $a$, and finally the radius of the eccentric 19 (or 19'), are chosen in such a way that, on the one hand, the holes $13_a$ may always be opposite the opening $9_a$ ($9'_a$), and that, on the other hand, these same holes may at one time be opposite the openings $a'$ (period of admission or suction of one cylinder of the set $1_a$), at another time opposite the openings $p$ (period of delivery of one cylinder of the set $1_a$), and at another time between these openings (end of the period of suction or of delivery). Also these holes 13 are, on the one hand, always opposite the openings 9 (9'), and on the other hand, these same holes 13 are at one time opposite the openings $a$ (period of suction of one cylinder of the set 1), at another time opposite the openings $p$ (period of delivery of one cylinder of the set 1), and at another time between these openings (end of the period of suction or of delivery).

The application of the means which have just been described and their combination make of the system regarded in its entirety a change speed apparatus with hydraulic transmission which presents the special advantages which have already been referred to at the beginning of this specification and which may be recapitulated as follows:—

I. The possibility of causing the primary shaft (shaft 2) to rotate at high speeds which, for example, may exceed 1500 revolutions, while the secondary shaft (shaft 24) can be put to any speed between zero and the number of revolutions of the shaft 2.

II. The slow speed of the distributing valve on its port face.

III. The perfect equilibrium of all the moving parts as well as of the stresses.

IV. Complete constancy of the delivery for any given position of the cylinder-cams.

V. The application of the valve on its port face for the whole of its circumference, by a regularly distributed pressure and hence a perfectly fluid tight junction which is maintained by the regular wear, amounting actually to polishing, of the valve, all the points of which receive an equal movement.

VI. The possibility of providing practically any desired number of sets of cylinders.

What we claim as our invention and desire to secure by Letters Patent is:—

1. A distributing arrangement for the purpose set forth comprising a system of motive pumps and a system of receiving pumps, an intermediate reservoir arranged between the said systems of pumps and into which the fluid to be distributed passes, the said reservoir comprising concentric chambers, one of said chambers forming an inlet or suction reservoir for the motive pumps, while another forms a delivery reservoir, a valve provided with holes corresponding in number to the number of cylinders or working spaces of the said pumps, said valve moving against a face of the intermediate reservoir, and means for imparting a planetary movement to said valve.

2. A distributing arrangement for the purpose set forth comprising a system of motive pumps and a system of receiving pumps, an intermediate reservoir arranged between the said systems of pumps and into which the fluid to be distributed passes, the said reservoir comprising three concentric chambers, the external and internal chambers serving as an inlet or suction reservoir for sets of pumps arranged upon the same driving shaft, the intermediate chamber serving as a common delivery chamber to the said sets of pumps, a valve, and means for operating the valve.

3. A distributing arrangement for the purpose set forth comprising a system of motive pumps and a system of receiving pumps, an intermediate reservoir arranged between the said two systems of pumps, and means for controlling the displacements of the pistons of the motive pump, said means comprising a disk, a pin or key held at its two extremities in the disk, and traversing the axis of the shaft, a cylinder cam arranged as described, the pin or key passing through the cam in a slot sufficiently long to admit of the longitudinal displacement of said cylinder cam.

4. A distributing arrangement for the purpose set forth comprising a system of motive pumps and a system of receiving pumps, an intermediate reservoir arranged between the said systems of pumps and into which the fluid to be distributed passes, the said reservoir comprising three concentric chambers, the external and internal chambers serving as an inlet or suction reservoir for sets of pumps arranged upon the same driving shaft, the intermediate chamber serving as a common delivery chamber to the said sets of pumps, means of communication between the said internal and external inlet or suction chambers, a valve, and means for operating the valve.

5. A distributing arrangement for the purpose set forth comprising a system of motive pumps and a system of receiving pumps, the said motive pumps being formed of two or more sets of pumps with radiating cylinders arranged about the driving shaft, said cylinders being preferably two in number in each set and their axes being from one set to the other displaced upon the driving shaft through such an angle that the piston strokes cross, that is to say, that the maxima of the variations of delivery of one of the sets correspond with the minima of the variations of the delivery of another set, an intermediate reservoir into which the fluid to be distributed passes, a valve, and means for operating the said valve.

6. A distributing arrangement for the purpose set forth comprising a system of motive pumps and a system of receiving pumps, an intermediate reservoir, and means for controlling the displacements of the pistons of two consecutive sets of motive pumps, comprising two cylinder cams having axes inclined to the axis of the driving shaft, the said cams being connected by one of their faces in such a way that they may lie symmetrically with respect to a plane perpendicular to the driving shaft passing through the junction faces, and means for displacing the cams along the driving shaft.

7. A distributing arrangement for the purpose set forth comprising a system of motive pumps and a system of receiving pumps, an intermediate reservoir into which the fluid to be distributed passes, and means for controlling the displacements of the pistons of the motive pumps comprising cylinder cams, a shaft upon which the said cylinder cams are mounted, and pins or keys by which the cams are mounted upon the shaft to permit of the cams being displaceable longitudinally and of the pins or keys serving as thrust bearings.

8. A distributing arrangement for the purpose set forth comprising a system of motive pumps and a system of receiving pumps, the said system of receiving pumps being formed of sets of pumps with radiating cylinders arranged about an intermediate shaft, the axes of the said cylinders being displaced from one set to the other at such an angle that the piston strokes cross, a reservoir, a valve, and means for operating the valve.

9. A distributing arrangement for the purpose set forth comprising a system of motive pumps and a system of receiving pumps, the said system of receiving pumps being formed of sets of pumps with radiating cylinders arranged about an intermediate shaft, the axes of the said cylinders being displaced from one set to the other at such an angle that the piston strokes cross, an element receiving the stroke of the pistons of the receiving pumps, comprising an eccentric in two parts mounted on the intermediate shaft, the two parts of the said eccentric being displaced one in relation to the other 180° and each eccentric transmitting to the intermediate shaft the effort of the corresponding set of pumps, a reservoir, a valve, and means for operating the valve.

In testimony whereof we have hereunto signed our names to this specification in the presence of two subscribing witnesses.

JULES NAËDER.
MAURICE NAËDER.

Witnesses:
HANSON C. COXE,
MIGUEL FEROLO.